United States Patent
Kamiyama et al.

(10) Patent No.: US 11,714,498 B2
(45) Date of Patent: Aug. 1, 2023

(54) ELECTRONIC PEN CORE BODY AND ELECTRONIC PEN

(71) Applicant: Wacom Co., Ltd., Saitama (JP)

(72) Inventors: Ryoji Kamiyama, Saitama (JP); Toshihiko Horie, Saitama (JP); Masamitsu Ito, Saitama (JP); Daisuke Watanabe, Saitama (JP)

(73) Assignee: Wacom Co., Ltd, Saitama (JP)

( * ) Notice: Subject to any disclaimer, the term of this patent is extended or adjusted under 35 U.S.C. 154(b) by 0 days.

(21) Appl. No.: 18/066,236

(22) Filed: Dec. 14, 2022

(65) Prior Publication Data

US 2023/0123155 A1 Apr. 20, 2023

Related U.S. Application Data (63) Continuation of application No. 17/513,775, filed on Oct. 28, 2021, which is a continuation of application No. PCT/JP2020/018482, filed on May 7, 2020.

(30) Foreign Application Priority Data

May 20, 2019 (JP) ................................ 2019-094201

(51) Int. Cl.
*G06F 3/0354* (2013.01)
(52) U.S. Cl.
CPC ................................ *G06F 3/03546* (2013.01)
(58) Field of Classification Search
CPC .................................................. G06F 3/03546
(Continued)

(56) References Cited

U.S. PATENT DOCUMENTS

| 2011/0219892 A1 | 9/2011 | Fukushima et al. |
| 2014/0111488 A1 | 4/2014 | Michihata et al. |

(Continued)

FOREIGN PATENT DOCUMENTS

| JP | 2011-186803 A | 9/2011 |
| JP | 2013-161307 A | 8/2013 |

(Continued)

OTHER PUBLICATIONS

International Search Report dated Jul. 14, 2020, for the corresponding International Patent Application No. PCT/JP2020/018482, 4 pages. (With English Translation).

*Primary Examiner* — Calvin C Ma
(74) *Attorney, Agent, or Firm* — Seed IP Law Group LLP (57) ABSTRACT

Provided is an electronic pen core body including a tip component portion coupled to an axis component portion. At least one end of the axis component portion in an axial direction is made of a material that is harder than a material from which the tip component portion is made. The axis component portion includes a recessed hole and a fitting portion directly or indirectly fitted to a pen pressure detector. The tip component portion includes a tip portion protruding from the one end of the axis component portion in the axial direction, a coupling core portion disposed within the recessed hole and coupled to an inner wall surface of the recessed hole of the axis component portion, and a second ring-shaped end surface that contacts a first ring-shaped end surface of the axis component portion. The first ring-shaped end surface is covered by the second ring-shaped end surface.

20 Claims, 6 Drawing Sheets

(58) Field of Classification Search
USPC .......................................................... 345/156
See application file for complete search history.

(56) References Cited

U.S. PATENT DOCUMENTS

| | | | |
|---|---|---|---|
| 2016/0187217 | A1 | 6/2016 | Horie et al. |
| 2017/0102792 | A1* | 4/2017 | Aoki ..................... G06F 3/0383 |
| 2018/0024657 | A1 | 1/2018 | Ninomiya et al. |
| 2019/0113991 | A1* | 4/2019 | Wu ..................... G06F 3/03545 |

FOREIGN PATENT DOCUMENTS

| | | |
|---|---|---|
| JP | 2014-21674 A | 2/2014 |
| JP | 2016-21134 A | 2/2016 |
| WO | 2016/006030 A1 | 1/2016 |
| WO | 2016/185915 A1 | 11/2016 |

* cited by examiner

ELECTRONIC PEN CORE BODY AND ELECTRONIC PEN

BACKGROUND

Technical Field

This disclosure relates to an electronic pen core body and an electronic pen.

Background Art

Recently, in place of an input section such as a button operation and a keyboard, an input apparatus that allows a user to use an electronic pen to input an operation, in addition to a finger operation on a touch panel in a display screen, is often adopted in an electronic device, such as a portable terminal with a display screen.

The portable terminal is becoming smaller, and accordingly, downsizing and miniaturization of the electronic pen are highly demanded. In addition to downsizing and miniaturization, improvement in the feel of writing of the electronic pen is also in high demand.

The feel of writing of the electronic pen is determined by the balance between the material of the pen tip (core body) and the material of the side that receives the input of the electronic pen (surface of the display screen of the portable terminal). Conventionally, the glass surface on the surface of the display screen of the portable terminal is operated by an electronic pen including a core body in which at least a tip portion as a pen tip is made of a hard resin such as POM (polyoxymethylene) (for example, see Japanese Patent Laid-Open No. 2014-21674).

However, in the case of the combination of the tip portion of the core body made of a hard resin and the glass surface, the tip portion of the electronic pen is slippery on the glass surface, and it is difficult to use the electronic pen to accurately indicate a predetermined position. Therefore, core bodies of various materials are tested. Among them, a core body made of felt is soft, and the feel of writing on the surface of glass is excellent. The core body is highly evaluated. Therefore, the core body made of felt can be used in the electronic pen, and the core bodies are already used in some electronic pens.

An adhesive or the like is used to harden a bundle of synthetic fibers to produce felt. The core body made of felt is fundamentally used in a writing tool that sucks up the ink from the tank storing the ink on the basis of capillary action and that uses the ink to make a note. The strength of the core body is not an issue, and the strength of the core body made of felt is low.

However, the electronic pen generally includes a pen pressure detector, and it is important that the pen pressure detector can accurately detect the pen pressure applied to the tip portion of the core body. Therefore, the core body needs to have strength that allows to accurately transmit the pen pressure applied to the tip portion to the pen pressure detector.

However, the strength of the core body made of felt is low as described above. Therefore, the core body may be bent, or the fibers may come apart when pressure is applied in the axial direction of the core body. The pressure applied to the tip is not easily transmitted to the other end. Therefore, a core body made of a felt material thick enough to maintain the strength needs to be used in conventional techniques, and it is very difficult to miniaturize the core body made of felt.

In addition, the durability of the core body made of felt is low during writing, and therefore, the core body needs to be replaceable. Thus, the core body is made such that the core body can be inserted and removed from a portion directly fitted to the pen pressure detector or from a portion fitted to a pressure transmission member (plunger member). In this case, it is important to firmly fit the core body to the fitting portion in order to transmit the pen pressure to the pen pressure detector as accurately as possible.

However, the felt is a bundle of fibers as described above, and therefore, it is difficult to firmly fit the core body to the fitting portion.

In addition, when pen pressure is applied to the tip portion of the core body in the electronic pen, the core body moves in the axial direction according to the applied pen pressure and transmits the pen pressure to the pen pressure detector. For example, in a case of an electromagnetic resonance electronic pen, the side of the core body opposite the tip portion is fitted to the fitting portion through a through hole formed on a magnetic core around which a coil is wound, and the core body moves through the through hole of the magnetic core.

The core body made of felt includes a bundle of fibers, and the side circumferential surface of the core body becomes a little fluffy. Therefore, the fluffy side circumferential surface may come into contact with the inner circumferential surface of the through hole of the magnetic core when the core body made of felt moves in the axial direction, and the pressure from the core body may not be accurately transmitted to the pen pressure detector.

Furthermore, the core body made of felt includes a bundle of fibers, and it is difficult to accurately process the core body on the basis of default values of the length in the axial direction and the thickness due to the softness and the fluffiness of the core body. There is a problem that the dimensional difference is large.

Other than felt, an example of a soft material with excellent feel of writing on the surface of glass includes an elastic material such as elastomer. However, the core body made of an elastic material such as elastomer also has a problem in strength similarly to the felt.

In this way, the core made of an elastic material, such as felt and elastomer, cannot be conventionally used in a miniaturized electronic pen used in a small electronic device, such as a portable terminal, and only a writing operation with poor feel of writing can be performed.

BRIEF SUMMARY

An object of this disclosure is to provide an electronic pen core body that can solve the problems.

To solve the problems, provided is an electronic pen core body including a tip component portion (e.g., made of felt) coupled to an axis component portion (e.g., made of a non-fibrous member), wherein: at least a first end of the axis component portion in an axial direction of the axis component portion is made of a material that is harder than harder than a material form which the tip component portion is made, the axis component portion includes: an inner wall surface of a recessed hole coupled to the tip component portion on at least the first end of the axis component portion in the axial direction, a fitting portion on a second end of the axis component portion in the axial direction, the fitting portion directly or indirectly fitted to a pen pressure detector provided on an electronic pen to transmit pen pressure to the pen pressure detector, and the tip component portion includes: a tip portion protruding from the one end of the axis component portion in the axial direction, a coupling core portion disposed within the recessed hole of the axis component portion and coupled to the inner wall surface of the recessed hole of the axis component portion on the one end of the axis component portion in the axial direction, and a second ring-shaped end surface on a side of the tip portion that is coupled to the coupling core portion, the second ring-shaped end surface contacting a first ring-shaped end surface around the recessed hole of the axis component portion on the first end of the axis component portion in the axial direction, and the first ring-shaped end surface is covered by the second ring-shaped end surface.

The tip component portion (e.g., made of felt) and the axis component portion (e.g., made of a non-fibrous member harder than felt) are coupled to form the electronic pen core body configured as described above. The tip component portion includes the coupling core portion and the tip portion. The coupling core portion is inserted into the recessed hole of the axis component portion, and in this state, the tip component portion is coupled to the axis component portion.

The second ring-shaped end surface, which is brought into contact with the first ring-shaped end surface around the recessed hole on the end of the axis component portion in the axial direction, is formed on a section of the tip portion of the tip component portion that is coupled to the coupling core portion. Therefore, the tip component portion and the axis component portion are coupled when the tip portion (e.g., made of the felt) protrudes from one end of the axis component portion in the axial direction and the second ring-shaped end surface is in contact with the first ring-shaped end surface on the first end of the axis component portion in the axial direction.

The fitting portion to be directly or indirectly fitted to the pen pressure detector is provided on the second end of the axis component portion in the axial direction. That is, the portion to be directly or indirectly fitted to the pen pressure detector is made, for example, of a non-fibrous member harder than the felt instead of the felt. Therefore, the direct fitting of the core body and the pen pressure detector or the fitting to a pressure transmission member is favorably performed.

The electronic pen core body configured as described above can be used as a core body of an electronic pen, and a writing operation can be performed with excellent feel of writing because the tip portion of the tip component portion of the core body is made of a relatively soft material, such as felt, for example.

The tip component portion (e.g., made of felt) in the electronic pen core body configured as described above is only the tip portion protruding from the axis component portion, and the axis portion of the core body includes the axis component portion, for example, made of a non-fibrous member harder than the felt. Therefore, compared to a case in which the entire core body is made of felt, the electronic pen core body configured as described above can increase the strength of the axis component portion and reduce the thickness of the axis component portion. The axis component portion provides the axis portion of the core body excluding the tip portion (e.g., made of felt), and the miniaturization of the axis component portion is directly linked to miniaturization of the core body. Therefore, the electronic pen core body configured as described above can be used as a core body of an electronic pen to miniaturize the electronic pen.

When pen pressure is applied to the tip portion made of felt in the electronic pen core body configured as described above, the pen pressure is transmitted to the axis component portion through a contact section of the second ring-shaped end surface of the tip component portion and the first ring-shaped end surface of the axis component portion. The fitting portion on the other end in the axial direction of the axis component portion of the electronic pen core body configured as described above is firmly fitted directly or indirectly to the pen pressure detector as described above. Therefore, the pen pressure applied to the tip portion (e.g., made of felt) in the electronic pen core body configured as described above is more accurately transmitted to the pen pressure detector.

In addition, the axis component portion is made of a material (e.g., non-fibrous member) that is harder than a material (e.g., felt) from which the tip component portion is made, and the side circumferential surface does not become fluffy. Therefore, the applied pen pressure is accurately transmitted to the pen pressure detector even when, for example, the axis component portion is directly or indirectly fitted to the pen pressure detector inserted into the through hole of the magnetic core.

The axis portion that makes up most of the core body includes the axis component portion made of a material (e.g., non-fibrous member) that is harder than a material (e.g., felt) from which the tip component portion is made. Therefore, it is easy to accurately process the axis portion on the basis of default values of the length in the axial direction and the thickness, and the dimensional difference can be reduced.

DETAILED DESCRIPTION

An embodiment of an electronic pen core body according to this disclosure will now be described with reference to the drawings along with an embodiment of an electronic pen using the electronic pen core body of the embodiment. In an example of the electronic pen of the embodiment described below, the electronic pen is coupled to a position detection apparatus on the basis of an electromagnetic resonance system to thereby indicate a position.

Figure 1A:
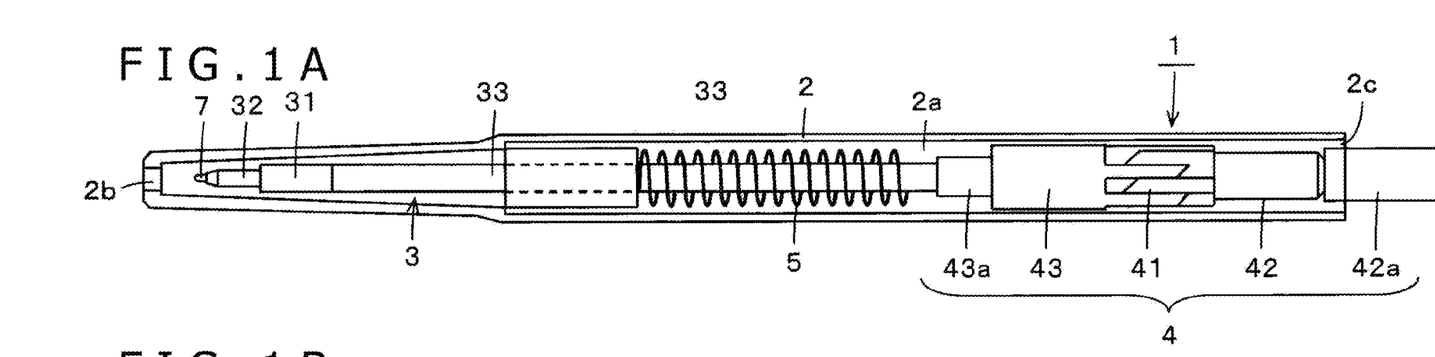
FIGS. 1A to 1C are diagrams for describing an electronic pen according to an embodiment of this disclosure.
Figure 1B:
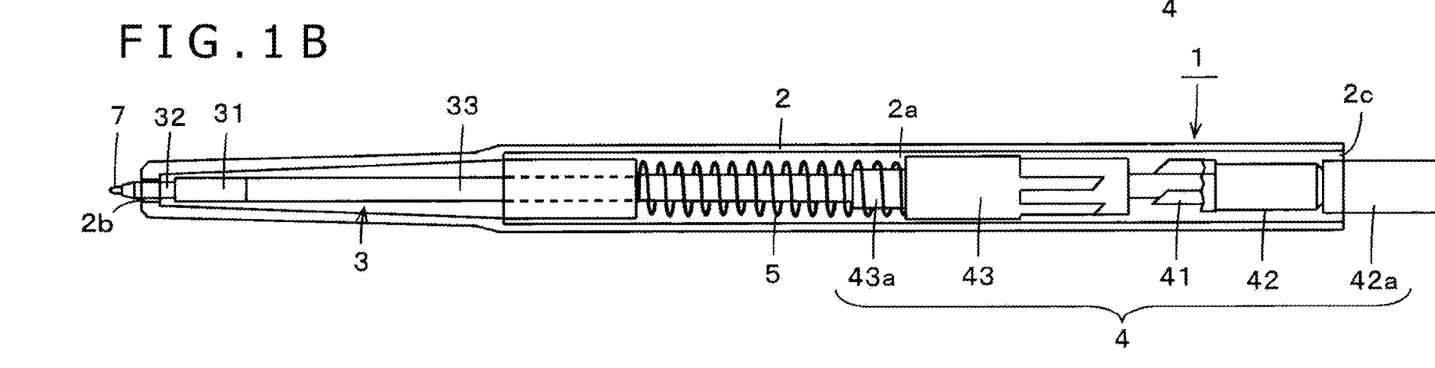
Figure 1C:
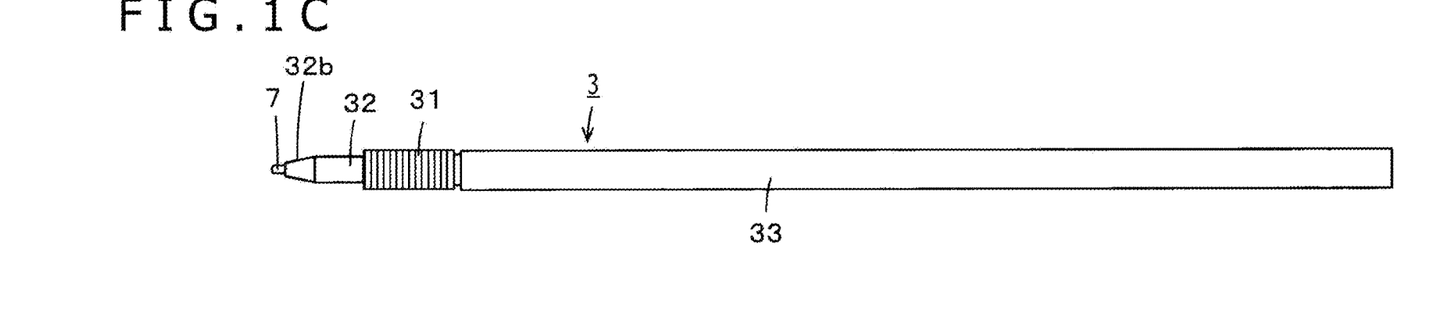

FIGS. 1A to 1C depict a configuration example of an electronic pen using an electronic pen core body according to an embodiment of this disclosure. An electronic pen 1 of the embodiment includes an electronic pen body portion 3 housed in a hollow portion 2a of a cylindrical housing 2 and has a knock-type configuration in which a pen tip side of the electronic pen body portion 3 is configured to move in and out from an opening 2b at one end of the housing 2 in the longitudinal direction. In the embodiment, the electronic pen body portion 3 is a cartridge type, and the electronic pen body portion 3 can be attached to and detached from the housing 2. The electronic pen body portion 3 includes an electronic pen core body (hereinafter, abbreviated as a core body) 7 of the embodiment. The core body 7 can be attached to and detached from the electronic pen body portion 3. In the example of FIGS. 1A to 1C, the housing 2 of the electronic pen 1 is made of a transparent synthetic resin, and the inside of the housing 2 can be seen through.

The electronic pen 1 of the embodiment is compatible with a commercially available knock-type ballpoint pen. The housing 2 and a knock cam mechanism portion 4 provided in the housing 2 have the same configurations as the configurations of the housing and the knock cam mechanism of a well-known commercially available knock-type ballpoint pen, and the dimensional relationship is also the same. The knock cam mechanism portion 4 has a well-known configuration including a combination of a cam body 41, a knock rod 42, and a rotor 43 as illustrated in FIGS. 1A and 1B.

When an end portion 42a of the knock rod 42 is pressed in the state of FIG. 1A, the knock cam mechanism portion 4 locks the electronic pen body portion 3 into the state of FIG. 1B in the housing 2, and the pen tip side of the electronic pen body portion 3 protrudes from the opening 2b of the housing 2. When the end portion 42a of the knock rod 42 is pressed again in the state of FIG. 1B, the knock cam mechanism portion 4 releases the locked state, and a return spring 5 returns the position of the electronic pen body portion 3 in the housing 2 to the state of FIG. 1A. The detailed configuration and operation of the knock cam mechanism portion 4 are well-known and will not be described here.

Figure 2A:
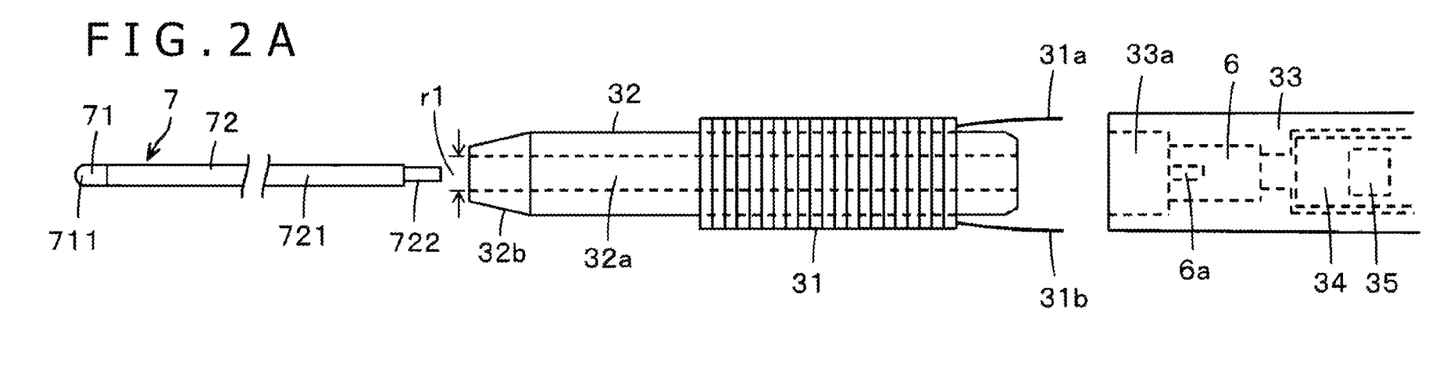
FIGS. 2A and 2B are enlarged views for describing an electronic pen body portion including an electronic pen core body according an embodiment of to this disclosure.
Figure 2B:
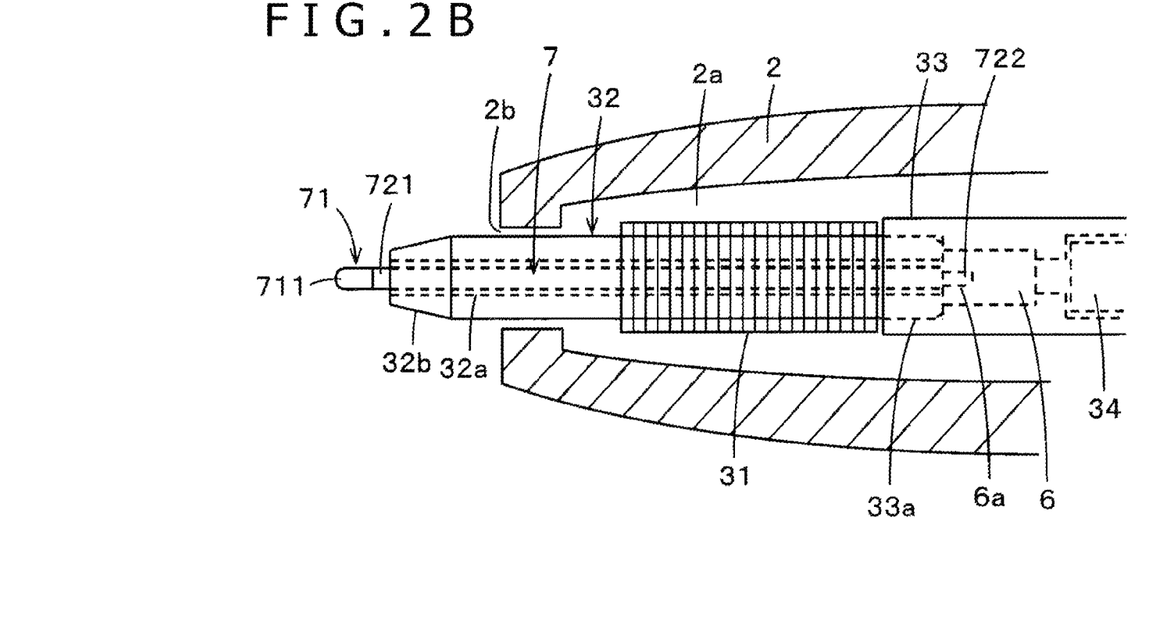
Figure 3A:
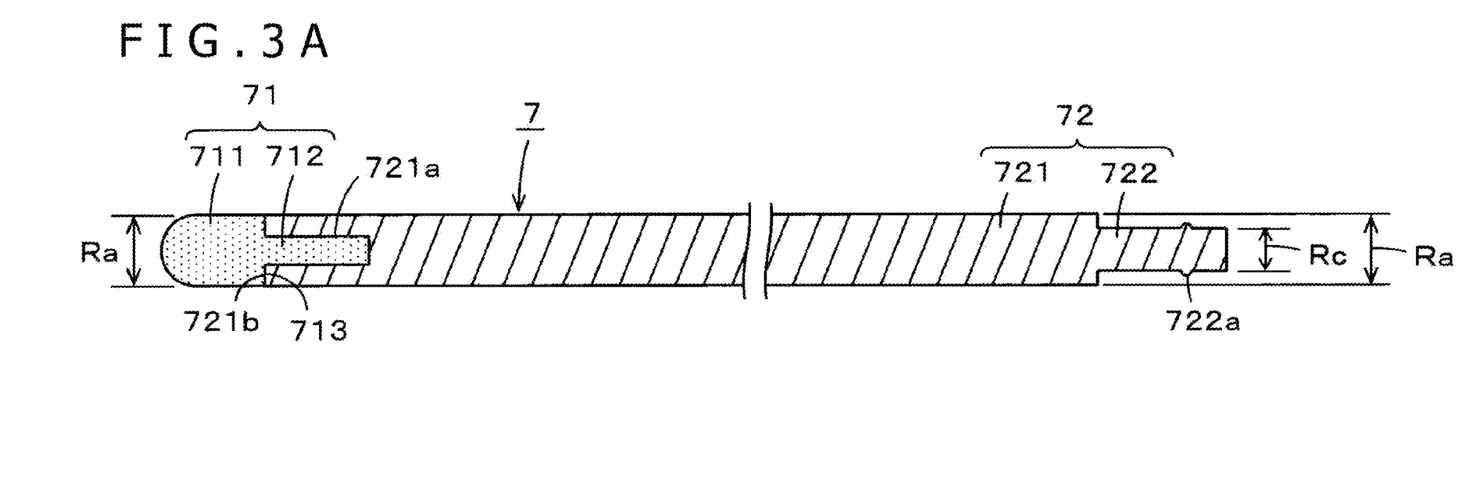
FIGS. 3A to 3C are diagrams for describing a configuration example of the electronic pen core body according to an embodiment of this disclosure.
Figure 3B:
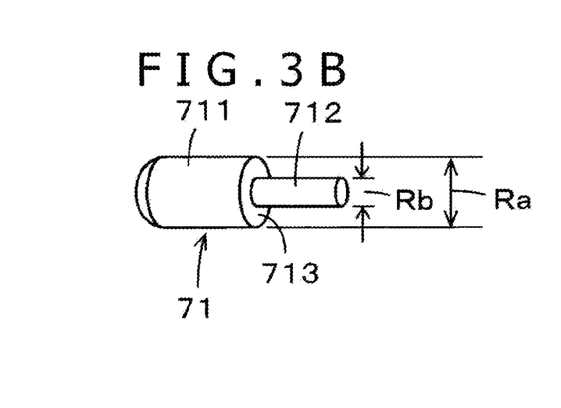
Figure 3C:
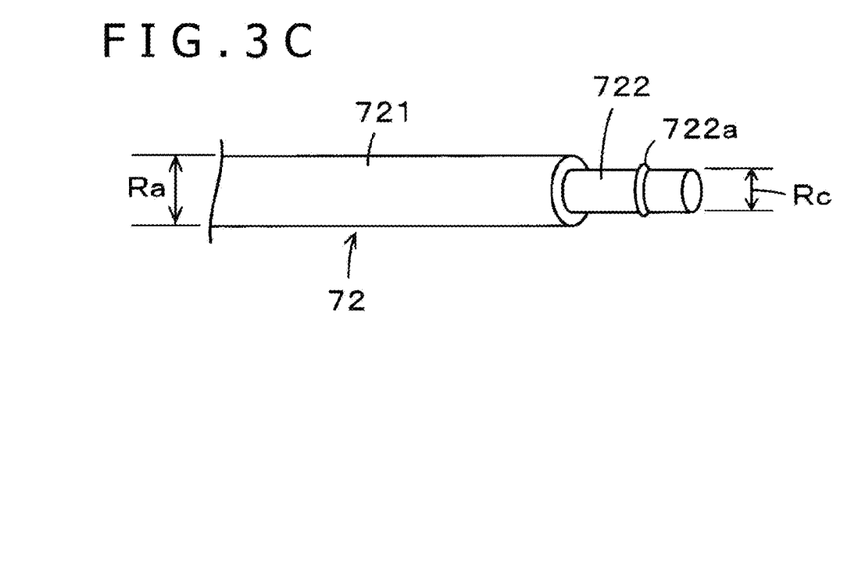

FIG. 1C depicts a configuration example of the electronic pen body portion 3. FIGS. 2A and 2B are partial, enlarged views for describing the configuration of the electronic pen body portion 3 on the pen tip side. FIGS. 3A to 3C are diagrams for describing a configuration example of the core body 7 of the embodiment installed on the electronic pen body portion 3.

In the electronic pen body portion 3 of the embodiment, a magnetic core, which is a ferrite core 32 in the example, around which a coil 31 is wound, is coupled to a cylindrical body portion 33 as illustrated in FIG. 1C. The core body 7 is inserted into a through hole (not illustrated in FIG. 1C) of the ferrite core 32 and fitted in an attachable and detachable manner to a pen pressure detector 6 (not illustrated in FIGS. 1A to 1C, see FIGS. 2A and 2B) provided in the cylindrical body portion 33, so that the core body 7 is provided as part of the electronic pen body portion 3 as described later. As illustrated in FIGS. 1C and 2B, an end portion of the core body 7 on the pen tip side protrudes from the ferrite core 32.

As illustrated in FIG. 2A, a through hole 32a in the axial direction with a predetermined diameter r1 (for example, r1=1 mm) for inserting the core body 7 is formed on, for example, a columnar ferrite material to form the ferrite core 32 of the example. A tapered portion 32b gradually becoming narrower is formed on the pen tip side of the ferrite core 32, and the magnetic coupling to the sensor of the position detection apparatus is stronger than when there is no tapered portion 32b.

In the embodiment, the winding position of the coil 31 in the ferrite core 32 is closer to the opposite side of the pen tip side, provided at a position approximately half the full length of the ferrite core 32 as illustrated in FIG. 2A. The part from the end portion of the ferrite core 32 on the pen tip side to one end of the coil winding section is a non-winding section around which the coil is not wound.

In the embodiment, the pen pressure detector 6 is provided near the section of the cylindrical body portion 33 coupled to the ferrite core 32. The pen pressure detector 6 in the example includes a semiconductor element in which the capacitance varies according to the pen pressure as disclosed in, for example, Japanese Patent Laid-Open No. 2013-161307. Note that the pen pressure detector 6 may include a variable capacitor with a well-known mechanical pen pressure detection section described in, for example, Japanese Patent Laid-Open No. 2011-186803, in which the capacitance varies according to the pen pressure.

A printed board 34 is also housed in the cylindrical body portion 33. The printed board 34 is provided with a capacitor 35 connected in parallel to the coil 31 to form a resonant circuit. A variable capacitor including the pen pressure detector 6 is connected in parallel to the capacitor 35 formed on the printed board 34, and part of the resonant circuit is provided.

In the electronic pen 1 of the embodiment, the resonant circuit is inductively coupled to the loop coil of the position detection sensor of the position detection apparatus to transfer signals. The position detection apparatus detects the position of the signal received from the electronic pen 1 on the position detection sensor to detect the indicated position of the electronic pen 1 and detects a change in the frequency or phase of the signal received from the electronic pen 1 to detect the pen pressure applied to the electronic pen 1.

As illustrated in FIG. 2B, the coil non-winding section of the ferrite core 32 on the opposite side of the pen tip side is fitted to a recessed portion 33a provided on the cylindrical body portion 33 to couple the ferrite core 32 to the cylindrical body portion 33. Although not illustrated, in coupling the ferrite core 32 to the cylindrical body portion 33, one end 31a and 31b of the coil 31 is electrically connected in parallel to the capacitor 35 provided on the printed board 34 of the cylindrical body portion 33.

The configuration of the core body 7 is as illustrated in FIGS. 3A to 3C in the embodiment. More specifically, FIG. 3A illustrates an enlarged cross-sectional view of the core body 7 of the embodiment. The core body 7 of the embodiment includes a tip component portion 71 made of felt and an axis component portion 72 that are coupled to each other to form the core body 7.

The tip component portion 71 includes a tip portion 711 and a coupling core portion 712 as illustrated in a perspective view of FIG. 3B.

The tip portion 711 in the example has a columnar shape in which one end in the axial direction, which is on the pen tip side, is hemispherical.

The coupling core portion 712 is integrated with the tip portion 711 so as to protrude in the axial direction from the center position of the end surface of the columnar tip portion 711 on the opposite side of the pen tip side in the axial direction. The coupling core portion 712 has a rod shape with an outer diameter Rb smaller than an outer diameter Ra (Rb<Ra) of the columnar tip portion 711. Therefore, a ring-shaped end surface 713 around the coupling core portion 712 is formed on the end surface of the tip portion 711 of the tip component portion 71 on the opposite side of the pen tip side.

The axis component portion 72 is made of a non-fibrous material harder than felt, which is an elastic resin material such as POM in the example. The axis component portion 72 includes an axis body portion 721 and a fitting portion 722 for fitting to the pen pressure detector 6.

The axis body portion 721 is a rod-shaped portion with an outer diameter equal to the outer diameter Ra of the tip portion 711 in the example, and the length of the axis body portion 721 in the axial direction is longer than the length of the through hole 32a of the ferrite core 32 in the axial direction. In this case, the dimension of the outer diameter Ra is smaller than the inner diameter r1 of the through hole 32a of the ferrite core 32.

The fitting portion 722 is a part inserted and fitted to a fitting hole 6a of the pen pressure detector 6 as illustrated in FIGS. 2A and 2B. In the example, the fitting portion 722 has a rod shape thinner than the axis body portion 721 as illustrated in FIGS. 3A and 3C. In the example, a ring-shaped protrusion portion 722a engaged with a ring-shaped recessed groove (not illustrated) formed on the inner wall surface of the fitting hole 6a of the pen pressure detector 6 to surely lock the core body 7 to the pen pressure detector 6 is formed on the side circumferential surface of the fitting portion 722. The tip component portion 71 is coupled to the side of the axis body portion 721 opposite the fitting portion 722 side in the axial direction.

In the example, the axis component portion 72 is fused and connected to the tip component portion 71 while the coupling core portion 712 of the tip component portion 71 is inserted into a recessed portion 721a formed on the axis body portion 721 as illustrated in FIG. 3A. Here, the fusion and connection denotes a coupling method of fusing (melting) the resin by heat to couple the resin to another member such as felt and then cooling the resin to solidify the resin. In the example, the axis component portion 72 is fused and connected to the tip component portion 71, for example, as follows.

For example, a heat-resistant member with an inner diameter of Ra including a columnar recessed portion longer than the axis component portion 72 in the axial direction is prepared. The tip component portion 71 made of felt is held on a bottom portion of a columnar recessed portion of the heat-resistant member with the tip portion 711 side down (bottom portion side). A resin heated and fused into liquid is poured into the recessed portion of the heat-resistant member so as to cover the coupling core portion 712 of the tip component portion 71. A lid member including a recessed portion in a shape corresponding to the fitting portion 722 of the axis component portion 72 is put on the recessed portion of the heat-resistant member.

Once the fused resin is cooled and hardened, the heat-resistant member and the lid member are removed. Consequently, the core body 7 including the tip component portion 71 coupled to the axis component portion 72 is formed as illustrated in FIG. 3A. In this case, the tip component portion 71 and the axis component portion 72 are fused and connected, and therefore, the resin is intertwined with the fibers of the felt. The tip component portion 71 and the axis component portion 72 are firmly coupled. At this point, the recessed portion 721a, into which the coupling core portion 712 of the tip component portion 71 is to be inserted, is formed on the axis body portion 721 of the axis component portion 72.

In this case, the resin fused into liquid comes into contact with not only the coupling core portion 712 of the tip component portion 71, but also the ring-shaped end surface 713 of the tip portion 711. The resin is also intertwined with the fibers of the felt at this part, and the tip component portion 71 and the axis component portion 72 are firmly coupled. A ring-shaped end surface 721b is formed around the recessed portion 721a of the axis body portion 721 of the axis component portion 72, and the ring-shaped end surface 721b is brought into contact with the ring-shaped end surface 713 of the tip portion 711 of the tip component portion 71.

In the embodiment, the axis body portion 721 of the axis component portion 72 is inserted into the through hole 32a of the ferrite core 32, and the fitting portion 722 of the axis component portion 72 is fitted to the fitting hole 6a of the pen pressure detector 6 as illustrated in FIG. 2B to thereby directly fit the core body 7 configured as described above to the pen pressure detector 6. In the fitting state, the tip portion 711 of the tip component portion 71 and part of the axis body portion 721 of the axis component portion 72 in the core body 7 protrude from the opening of the ferrite core 32 on the tip side.

When only the tip portion 711 of the core body 7 protrudes from the ferrite core 32, the part of the tip portion 711 made of felt needs to be gripped to pull out the core body 7 from the electronic pen body portion 3. Therefore, it is difficult to pull out the core body 7, and the tip part made of felt may be damaged.

On the other hand, in the embodiment, part of the axis body portion 721 of the axis component portion 72 made of a hard resin protrudes from the opening of the ferrite core 32 on the pen tip side along with the tip portion 711, and part of the protruding axis body portion 721 can be gripped to pull out the core body 7. Therefore, the core body 7 can be easily pulled out from the electronic pen body portion 3 without damaging the tip portion made of felt.

The length of the core body 7 of the embodiment is set such that the axis component portion 72 made of a hard resin is inserted into the through hole 32a of the ferrite core 32 and fitted to the pen pressure detector 6, and the tip portion 711 made of felt, which can be short in the axial direction, is coupled to one end of the axis component portion 72 in the axial direction as described above. Therefore, the parts of the core body 7 other than the tip portion 711 made of felt, which can be short, are included in the axis component portion 72 made of a hard resin, and the strength is remarkably higher than when the entire core body is made of felt.

Therefore, the strength is sufficient even when the core body 7 configured as described above is miniaturized, and the core body 7 can be used to miniaturize the electronic pen that allows a writing operation with excellent feel of writing because the tip portion 711 is made of felt.

In the embodiment, the ring-shaped end surface 713 of the tip portion 711 made of felt and the ring-shaped end surface 721b of the axis component portion 72 form a contact section when the tip component portion 71 and the axis component portion 72 are coupled in the core body 7. Therefore, the pen pressure applied to the tip portion 711 of the tip component portion 71 is transmitted to the axis component portion through the contact section of the ring-shaped end surface 713 and the ring-shaped end surface 721b. Furthermore, the fitting portion 722 of the axis component portion 72 of the core body 7 is fitted to the pen pressure detector, and the pen pressure applied to the tip portion 711 is accurately and surely transmitted to the pen pressure detector 6.

The axis component portion 72 of the core body 7 is made of a hard resin, and the part does not become fluffy, unlike in the case where the part is made of felt. This allows the core body 7 to move in the axial direction without friction in the through hole 32a of the ferrite core 32 according to the applied pen pressure. Therefore, the pen pressure can be accurately and surely transmitted to the pen pressure detector 6 even when the tip portion 711 of the core body 7 is made of felt.

Furthermore, the axis component portion 72 made of resin is fused and connected to the tip component portion 71 made of felt in the core body 7 of the embodiment. Therefore, the fibers of the felt of the tip component portion 71 and the resin of the axis component portion 72 are intertwined and coupled, and the tip component portion 71 and the axis component portion 72 are firmly coupled.

During use of the electronic pen 1, the tip portion 711 of the core body 7 protrudes from the opening 2b of the housing 2 in the electronic pen 1 of the embodiment as illustrated in FIG. 2B. Also, part of the ferrite core 32 protrudes from the opening 2b of the housing 2 in the electronic pen 1 of the embodiment as illustrated in FIG. 2B. The distance from the tip of the tapered portion 32b of the ferrite core 32 to the input surface of the position detection sensor becomes short. Therefore, according to the electronic pen 1 of the embodiment, the electromagnetic coupling to the sensor is stronger than in the conventional electronic pen in which the ferrite core 32 stays in the hollow portion 2a of the housing 2. In the embodiment, the ferrite core 32 includes the tapered portion 32b on the tip portion 711 side of the core body 7. The cross-sectional area of the tip of the ferrite core 32 is small, and the magnetic flux density is increased. As a result, the electromagnetic coupling to the position detection sensor is strong.

Therefore, even when the electronic pen 1 of the embodiment is miniaturized, the electromagnetic coupling to the position detection sensor can be strong, and the position detection apparatus can detect the indicated position of the electronic pen 1 with high sensitivity.

Other Embodiments of Electronic Pen Core Body

Although the axis component portion 72 made of resin is fused and connected to the tip component portion 71 made of felt in the core body 7 of the embodiment, the tip component portion may be pressed, fitted, and coupled to the axis component portion to form the core body.

First Example of Another Embodiment of Electronic Pen Core Body

Figure 4A:
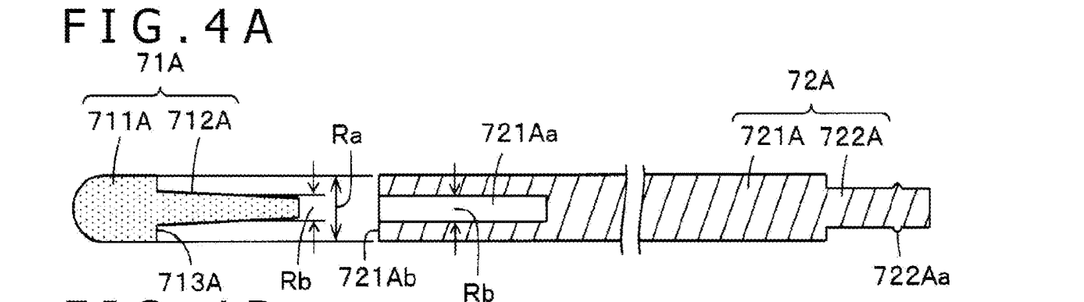
FIGS. 4A and 4B are diagrams for describing a configuration example of an electronic pen core body according to another embodiment of this disclosure.
Figure 4B:
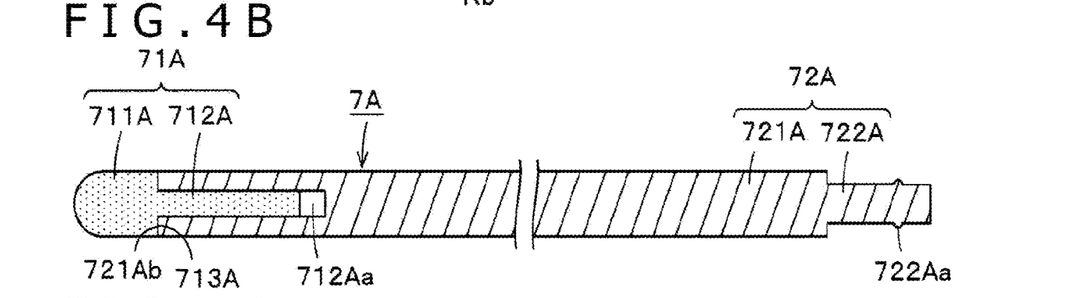

FIGS. 4A and 4B are enlarged cross-sectional views for describing a first example of another embodiment of the electronic pen core body. An electronic pen core body 7A (hereinafter, abbreviated as a core body 7A) of the first example includes a tip component portion 71A made of felt and an axis component portion 72A made of a hard resin as illustrated in FIG. 4A, as in the core body 7 of the embodiment.

The tip component portion 71A of the core body 7A of the first example is made of felt and includes a tip portion 711A and a coupling core portion 712A as in the tip component portion 71. The configuration of the tip portion 711A of the tip component portion 71A of the core body 7A in the example is similar to the configuration of the tip portion 711 of the tip component portion 71 of the core body 7. One end of the tip portion 711A in the axial direction, which is a pen tip side, is hemispherical, and the tip portion 711A has a columnar shape with an outer diameter of Ra.

The coupling core portion 712A is integrated with the tip portion 711 so as to protrude in a rod shape in the axial direction from the center position of the end surface of the columnar tip portion 711 on the opposite side of the pen tip side in the axial direction, similarly to the coupling core portion 712 of the tip component portion 71 of the core body 7. However, the coupling core portion 712A in the core body 7A of the example is slightly longer than the coupling core portion 712 in the axial direction. The rod-shaped coupling core portion 712A has a tapered shape, in which the outer diameter is thickest on the tip portion 711A side and becomes narrower toward the tip side, as illustrated in FIG. 4A. The outer diameter of the tapered rod-shaped coupling core portion 712A at, for example, the middle in the axial direction is equal to the outer diameter Rb smaller than the outer diameter Rb (Rb<Ra) of the tip portion 711 in the example.

On the other hand, although the axis component portion 72A includes a columnar axis body portion 721a with an outer diameter of Ra and a fitting portion 722A as in the axis component portion 72 of the embodiment, the axis component portion 72A is formed in advance as an individual object made of resin in the example. A recessed portion 721Aa fitted to the coupling core portion 712A of the tip component portion 71A is formed on the opposite side of the fitting portion 722A side in the axial direction of the axis body portion 721A of the axis component portion 72A as illustrated in FIG. 4A.

The inner diameter of the recessed portion 721Aa is equal to the outer diameter Rb at, for example, the middle of the tapered rod-shaped coupling core portion 712A in the axial direction as illustrated in FIG. 4A. In the example, the depth of the recessed portion 721Aa (length in the axial direction) is larger than the length of the coupling core portion 712A of the tip component portion 71A in the axial direction. Note that the depth of the recessed portion 721Aa (length in the axial direction) can be a length that allows to completely fit the coupling core portion 712A of the tip component portion 71A, and the length may be equal to the length of the coupling core portion 712A of the tip component portion 71A in the axial direction.

The coupling core portion 712A of the tip component portion 71A is pressed and fitted into the recessed portion 721Aa of the axis body portion 721A of the axis component portion 72A. In this case, the coupling core portion 712A of the tip component portion 71A is formed in a tapered shape becoming thinner toward the tip, and the side coupled to the tip portion 711A is slightly larger than the inner diameter Rb of the recessed portion 721Aa. Therefore, the coupling core portion 712A of the tip component portion 71A is firmly fitted in the recessed portion 721Aa.

In the example, an adhesive is applied to a ring-shaped end surface 713A of the coupling core portion 712A and the tip portion 711A of the tip component portion 71A before the insertion into the recessed portion 721Aa, or an adhesive is applied inside of the recessed portion 721Aa and on a ring-shaped end surface 721Ab to glue the ring-shaped end surface 713A of the coupling core portion 712A and the tip portion 711A of the tip component portion 71A to the inside of the recessed portion 721Aa and the ring-shaped end surface 721Ab. The coupling core portion 712A of the tip component portion 71A and the inside of the recessed portion 721Aa are firmly coupled.

It is obvious that the core body 7A of the first example has effects similar to the core body 7 of the embodiment.

Second Example of Another Embodiment of Electronic Pen Core Body

Figure 5A:
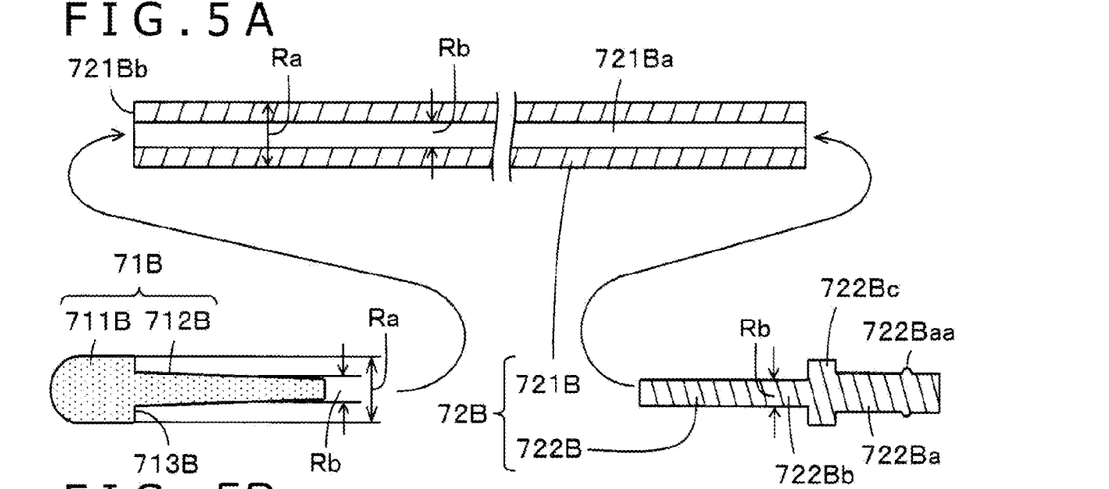
FIGS. 5A and 5B are diagrams for describing a configuration example of an electronic pen core body according an embodiment of to this disclosure.
Figure 5B:
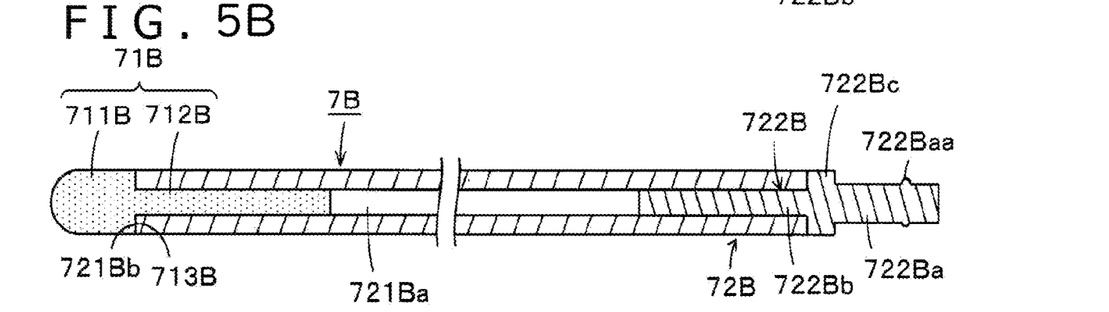

FIGS. 5A and 5B are enlarged cross-sectional views for describing a second example of another embodiment of the electronic pen core body. An electronic pen core body 7B (hereinafter, abbreviated as a core body 7B) of the second example includes a tip component portion 71B and an axis component portion 72B as illustrated in FIGS. 5A and 5B as in the core bodies 7 and 7A of the embodiments described above. The tip component portion 71B and the axis component portion 72B are coupled to form the core body 7B of the second example as illustrated in FIG. 5B.

The tip component portion 71B of the core body 7B of the second example is made of felt and includes a tip portion 711B and a coupling core portion 712B configured similarly to the tip component portion 71A of the core body 7A of the first example. The coupling core portion 712B has a tapered shape becoming narrower. However, the length of the coupling core portion 712B in the axial direction is longer than the coupling core portion 712A of the first example as illustrated in FIG. 5A. However, the length of the coupling core portion 712B in the axial direction may be the same as or shorter than the coupling core portion 712A of the first example.

An axis body portion 721B and a fitting portion 722B are provided as separate members in the axis component portion 72B of the second example, and the fitting portion 722B is fitted to the axis body portion 721B to form the axis component portion 72B.

The axis body portion 721B of the axis component portion 72B of the second example is made of a non-fibrous member harder than felt, which is metal such as SUS (steel use stainless) in the example, and as illustrated in FIG. 5A, the axis body portion 721B has a cylindrical pipe shape. The outer diameter of the axis body portion 721B made of the metal pipe is equal to the outer diameter Ra of the tip portion 711B of the tip component portion 71B. The inner diameter of a hollow portion 721Ba of the axis body portion 721B is equal to the outer diameter Rb at, for example, the middle in the axial direction of the tapered coupling core portion 712B in the tip component portion 71B.

As illustrated in FIGS. 5A and 5B, the coupling core portion 712B of the tip component portion 71B is pressed into a hollow portion 721Ba on one end in the axial direction of the axis body portion 721B made of the metal pipe, and an adhesive is used to glue the coupling core portion 712B to the hollow portion 721Ba. In this way, the tip component portion 71B is coupled to the axis body portion 721B such that the tip portion 711B protrudes from the axis body portion 721B, and as illustrated in FIG. 5B, the core body 7C is formed. In this case, a ring-shaped end surface 713Bb of the tip portion 711B is brought into contact with a ring-shaped end surface 721Bb of the axis body portion 721B as illustrated in FIG. 5B, and this is similar to the core bodies 7 and 7A in the examples described above.

The fitting portion 722B of the axis component portion 72B is made of a non-fibrous member harder than felt, which is an elastic hard resin such as POM in the example. In the fitting portion 722B, a pen pressure detector fitting portion 722Ba fitted to the pen pressure detector 6 and an axis body portion fitting portion 722Bb inserted into the hollow portion 721Ba of the axis body portion 721B and fitted to the axis body portion 721B are linked in the axial direction through a link portion 722Bc as illustrated in FIGS. 5A and 5B.

The configuration of the pen pressure detector fitting portion 722Ba is similar to the fitting portion 722A of the axis component portion 72A of the core body 7A in the example described above, and the pen pressure detector fitting portion 722Ba includes a ring-shaped protrusion portion 722Baa to be fitted and locked to the fitting hole 6a of the pen pressure detector 6.

The outer diameter of the axis body portion fitting portion 722Bb is equal to or slightly smaller than the inner diameter Rb of the hollow portion 721Ba of the axis body portion 721B. The axis body portion fitting portion 722Bb is pressed into the hollow portion 721Ba of the axis body portion 721B or pressed into and glued with an adhesive to the hollow portion 721Ba.

The link portion 722Bc in the example is formed in a disk shape with an outer diameter equal to the outer diameter Ra of the axis body portion 721B. As illustrated in FIG. 5B, the link portion 722Bc is brought into contact with the end surface of the axis body portion 721B when the axis body portion fitting portion 722Bb of the fitting portion 722B is fitted into the hollow portion 721Ba of the axis body portion 721B.

In the core body 7B of the second example, the axis body portion 721B of the axis component portion 72B is a metal pipe. Therefore, the strength of the core body 7B is higher than when the axis body portion 721B is made of resin, and the core body 7B can be further miniaturized. The core body 7B of the second example can be manufactured by coupling the tip component portion 71B made of felt to one end in the axial direction of the axis body portion 721B made of a metal pipe and fitting the fitting portion 722B made of resin to the other end in the axial direction. Therefore, there is an advantageous effect that the core body 7B can be easily manufactured.

Although the coupling core portions 712A and 712B of the tip component portions 71A and 71B of the core body 7A in the first example and the core body 7B in the second example have a tapered shape becoming narrower toward the tip side, the coupling core portions 712A and 712B may have a rod shape with a constant outer diameter, and the coupling core portions 712A and 712B may not be tapered.

Other Embodiments and Modifications

Although the outer diameters of the tip portions 711, 711A, and 711B of the tip component portions 71, 71A, and 71B are equal to the outer diameters of the axis body portions 721, 721A, and 721B in the core bodies 7, 7A, and 7B of the embodiments, the outer diameters may not be equal to each other as long as the ring-shaped end surfaces 713, 713A, and 713B of the tip portions 711, 711A, and 711B and the ring-shaped end surfaces 721b, 721Ab, and 721Bb of the axis body portions 721, 721A, and 721B are brought into contact with each other.

Figure 6:
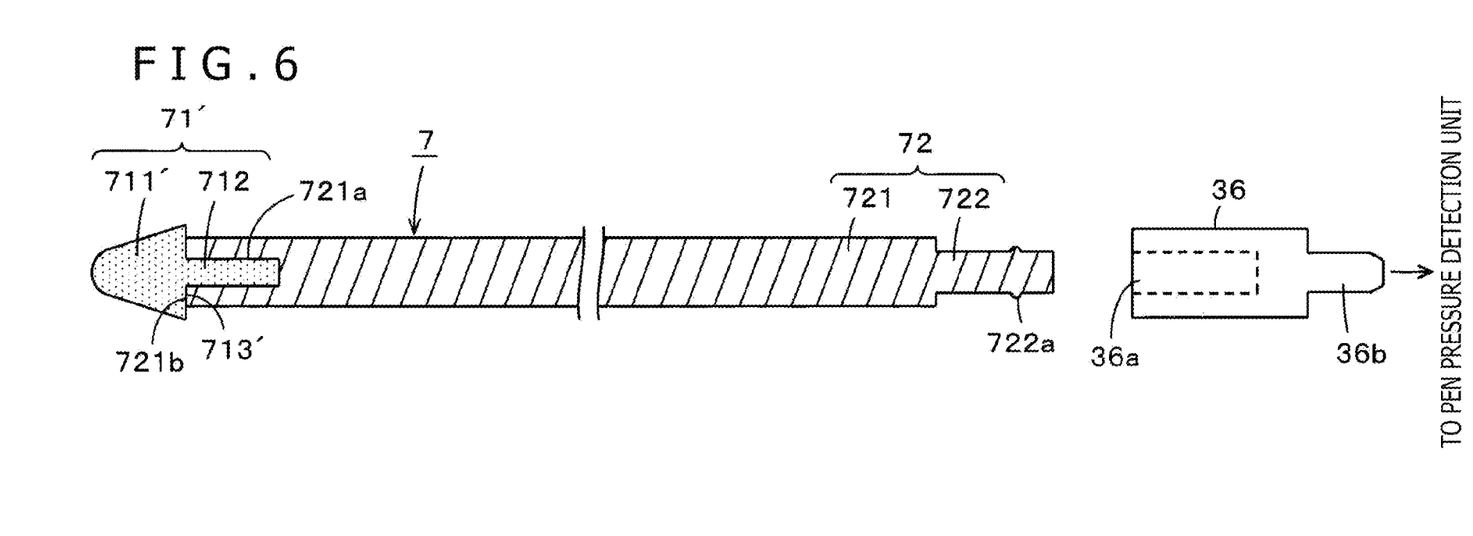
FIG. 6 is a diagram for describing a configuration example of an electronic pen core body according to another embodiment of this disclosure.

FIG. 6 illustrates a core body 7' of an example in which the tip portion 711 of the tip component portion 71 in the core body 7 of the embodiment is modified. In the core body 7' of the example in FIG. 6, the outer diameter of a tip portion 711' of a tip component portion 71' on the side of the section coupled to the coupling core portion 712 is larger than the outer diameter of the axis body portion 721. In this case, a ring-shaped end surface 713' of the tip portion 711' is larger than the ring-shaped end surface 713b of the axis body portion 721, and the pen pressure applied to the tip portion 711' is more surely transmitted to the axis body portion 721.

In the embodiments, the fitting portions 722, 722A, and 722B of the core bodies 7, 7A, and 7B are directly fitted to the pen pressure detector 6. However, pressure transmission members may be provided between the core bodies 7, 7A, and 7B and the pen pressure detector 6, and the core bodies 7, 7A, and 7B may be indirectly fitted to the pen pressure detector 6 through pressure transmission members 36.

For example, in the case of the core body 7 of the example in FIG. 6, the pressure transmission member 36 including a fitting recessed portion 36a for fitting the fitting portion 722 of the core body 7 and a fitting projection portion 36b fitted to a fitting recessed portion of the pen pressure detector is placed between the core body 7 and the pen pressure detector.

Although the tip component portion of the core body is made of only felt in the examples of the embodiments, the tip component portion may be made of two types of materials with different hardness as described below.

Figure 7A:
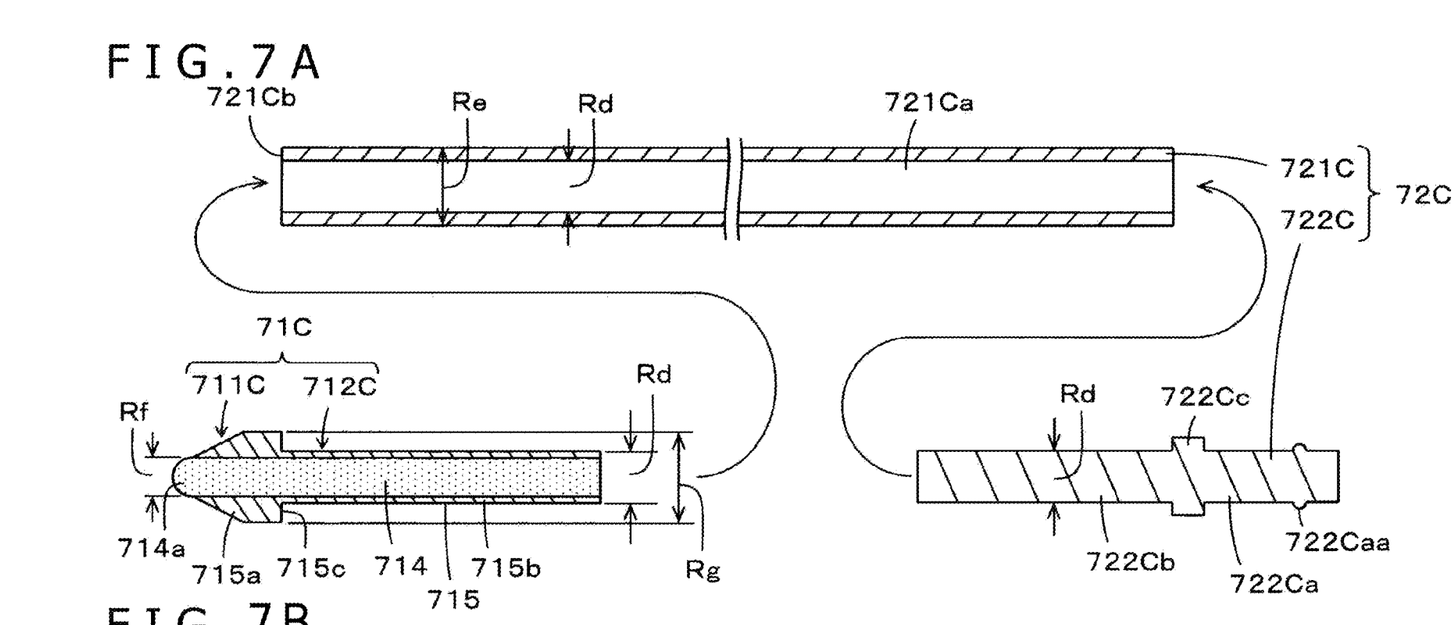
FIGS. 7A and 7B are diagrams for describing a configuration example of an electronic pen core body according to another embodiment of this disclosure.
Figure 7B:
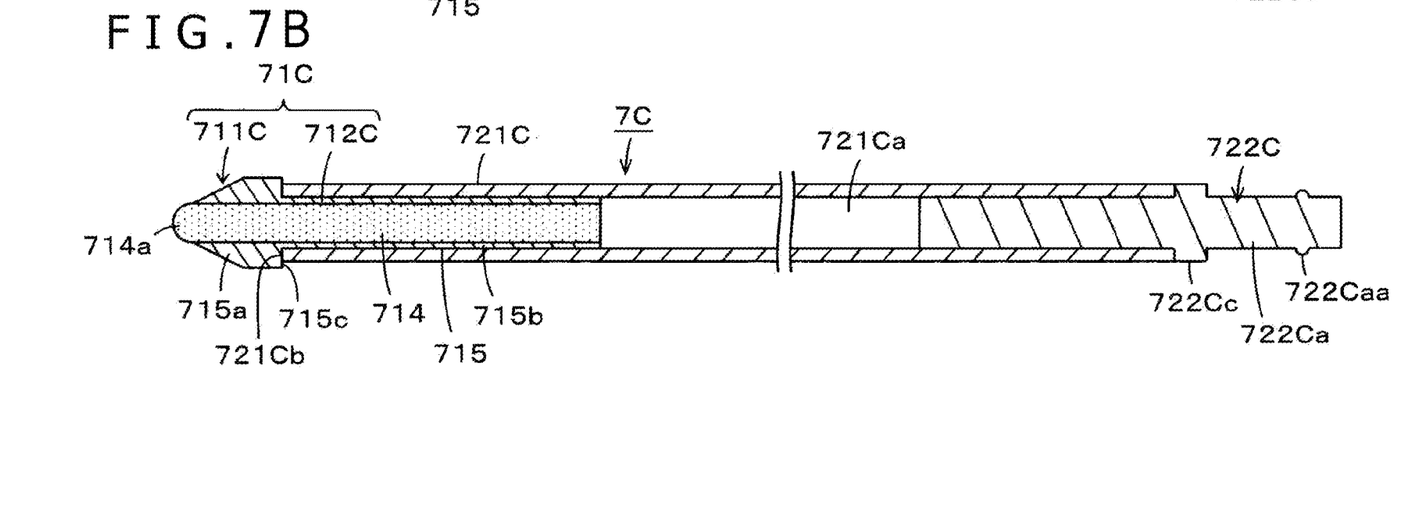

FIGS. 7A and 7B are enlarged cross-sectional views for describing a configuration example of an electronic pen core body 7C configured in that way. As illustrated in FIGS. 7A and 7B, the electronic pen core body 7C (hereinafter, abbreviated as a core body 7C) of the example includes a tip component portion 71C and an axis component portion 72C as in the examples described above. The axis component portion 72C has a configuration similar to the axis component portion 72B of the core body 7B in the second example of the embodiment of the electronic pen core body described with reference to FIGS. 5A and 5B, and the configuration of the tip component portion 71C is different from the examples described above. The tip component portion 71C and the axis component portion 72C are coupled to form the core body 7C of this example as illustrated in FIG. 7B.

A cylindrical pipe-shaped axis body portion 721C (FIG. 7A) made of a material harder than the tip component portion 71C, which is metal such as SUS in the example, and a fitting portion 722C made of an elastic hard resin, such as POM, provided on the opposite side of the side of the axis body portion 721C coupled to the tip component portion 71C are coupled to form the axis component portion 72C in the example of FIGS. 7A and 7B, similarly to the axis component portion 72B of the core body 7B described with reference to FIGS. 5A and 5B.

As in the examples described above, a pen pressure detector fitting portion 722Ca fitted to the pen pressure detector 6 and an axis body portion fitting portion 722Cb inserted into a hollow portion 721Ca of the axis body portion 721C and fitted to the axis body portion 721C are linked in the axial direction through a link portion 722Cc in the fitting portion 722C of the axis component portion 72C as illustrated on the right side of FIG. 7B. The pen pressure detector fitting portion 722Ca includes a ring-shaped protrusion portion 722Caa to be fitted and locked to the fitting hole 6a of the pen pressure detector 6 as in the example of FIG. 5A and 5B.

The outer diameter of the axis body portion fitting portion 722Cb is equal to or slightly smaller than an inner diameter Rd of the hollow portion 721Ca of the axis body portion 721C as illustrated in FIG. 7A. The axis body portion fitting portion 722Cb is pressed into the hollow portion 721Ca of the axis body portion 721C or pressed into and glued with an adhesive to the hollow portion 721Ca.

The link portion 722Cc of the fitting portion 722C has a disk shape with an outer diameter equal to an outer diameter Rc of the axis body portion 721C in the example. As illustrated in FIGS. 7A and 7B, the link portion 722Cc is brought into contact with the end surface of the axis body portion 721C when the axis body portion fitting portion 722Cb of the fitting portion 722C is fitted into the hollow portion 721Ca of the axis body portion As illustrated in FIGS. 7A and 7B, the tip component portion 71C of the core body 7C in the example has an appearance including a tip portion 711C protruding from the axis component portion 72C and a coupling core portion 712C as in the core bodies of the examples described above. The tip component portion 71C includes: a tip center portion 714 made of a soft material (for example, elastic material), which is elastomer in the example, with favorable feel of writing; and a tip periphery portion 715 made of a material harder than the tip center portion 714 and softer than the axis component portion 72C, which is POM in the example.

The tip center portion 714 has a columnar shape with a length from the tip portion 711C to the coupling core portion 712C in the axial direction of the core body 7C and with an outer diameter Rf (<Rd) smaller than the inner diameter Rd of the hollow portion 721Ca of the axis body portion 721C. In the example, a tip 714a of the tip center portion 714 has a curved surface shape, such as a partial shape of sphere and a dome shape.

The tip periphery portion 715 covers the part of the tip center portion 714 excluding the tip 714a. In this case, as illustrated in FIGS. 7A and 7B, a part 715b of the coupling core portion 712C of the tip periphery portion 715 concentrically covers the part of the coupling core portion 712C of the tip center portion 714, and the outer diameter is a diameter equal to the inner diameter Rd of the hollow portion 721Ca of the axis body portion 721C or slightly smaller than the inner diameter Rd.

A part 715a of the tip portion 711C of the tip periphery portion 715 includes a part projecting in a direction orthogonal to the axial direction from the section of the tip portion 711C coupled to the coupling core portion 712C and has a tapered shape becoming narrower toward the tip 714a of the tip center portion 714. In this case, the curved surface shape part of the tip 714a of the tip center portion 714 is exposed without being covered by the tip periphery portion 715. Therefore, the tip 714a of the tip center portion 714 as the pen tip of the electronic pen comes into contact with the input surface of the position detection sensor, and excellent feel of writing can be obtained.

The tip periphery portion 715 is shaped in this way, and therefore, a step portion including a ring-shaped end surface 715c is formed between the part 715a of the tip portion 711C of the tip periphery portion 715 and the part 715b of the coupling core portion 712C. In the example, an outer diameter Rg of the part projecting in the direction orthogonal to the axial direction in the part 715a of the tip portion 711C of the tip periphery portion 715 is larger than an outer diameter Re of the axis component portion body 721C of the axis component portion 72C. Therefore, a ring-shaped end surface 721Cb of the axis component portion body 721C is covered by the ring-shaped end surface 715c of the tip periphery portion 715.

Note that the outer diameter Rg of the part projecting in the direction orthogonal to the axial direction of the part 715a of the tip portion 711C of the tip periphery portion 715 may be equal to the outer diameter Re of the axis component portion body 721C when the ring-shaped end surface 721Cb of the axis component portion body 721C is covered by the ring-shaped end surface 715c of the tip periphery portion 715.

The tip periphery portion 715 is fused and connected to the tip center portion 711C to form the core body component portion 71C of the example. Instead of the fusion and connection, the tip center portion 714 may be inserted into the through hole of the tip periphery portion 715 to fix them with an adhesive, or they may be fixed in a press-fit state.

As illustrated in FIGS. 7A and 7B, the coupling core portion 712C of the tip component portion 71C is pressed into and glued with an adhesive to a hollow portion 712Ca on one end in the axial direction of the axis body portion 721C made of a metal pipe. In this way, the tip component portion 71C is coupled to the axis body portion 721C such that the tip portion 711C protrudes from the axis body portion 721C, and the core body 7C is formed as illustrated in FIG. 7B. In this case, as illustrated in FIG. 7B, a ring-shaped end surface 715Cb of the tip periphery portion 715 of the tip portion 711C is brought into contact with the ring-shaped end surface 721Cb of the axis body portion 721C, and this is similar to the core bodies 7, 7A, and 7B in the examples described above.

In the core body 7C of the example, the tip periphery portion 715 softer than the axis component portion 72C and harder than the tip center portion 714 covers the tip center portion 714 including the core body component portion 71C softer than the tip periphery portion 715, except for the tip 714a of the tip center portion 714. Therefore, the strength of the core body component portion can be higher than in the core bodies 7, 7A, and 7B including the core body component portions made of only felt.

Therefore, according to the core body 7C of the example, the pen pressure applied to the tip 714a of the tip center portion 714 can be more surely transmitted to the pen pressure detector 6.

Although the elastomer is used for the tip center portion 714 in the example of FIGS. 7A and 7B, felt may be used to form the tip center portion 714, or a member of another soft material may be used to form the tip center portion 714.

Although the electronic pen includes the electronic pen body portion in a form of cartridge and includes the knock-type mechanism in the examples, the electronic pen may not include the electronic pen body portion in a form of cartridge or the knock-type mechanism. This disclosure can be applied to any electronic pen that includes at least the tip portion of the electronic pen core body protruding from the opening of the cylindrical housing.

It is to be noted that the embodiments of the present disclosure is not limited to the foregoing embodiments, and that various changes can be made without departing from the spirit of the present disclosure.

What is claimed is:

1. An electronic pen core body comprising:
a tip component portion; and
an axis component portion coupled to the tip component portion, wherein:
the axis component portion includes:
a cylindrical metal pipe having an inner wall surface surrounding a recessed hole, the inner wall surface of the cylindrical metal pipe coupled to the tip component portion on at least a first end of the cylindrical metal pipe in an axial direction of the axis component portion, and
a fitting portion having an axis body portion fitting portion disposed within the recessed hole of the cylindrical metal pipe and coupled to the inner wall surface of the cylindrical metal pipe on a second end of the cylindrical metal pipe in the axial direction, and a pen pressure detector fitting portion disposed outside of the cylindrical metal pipe, the pen pressure detector fitting portion having a ring-shaped protrusion portion configured to be fitted to a fitting hole of a pen pressure detector provided on an electronic pen to transmit pen pressure to the pen pressure detector.

2. The electronic pen core body according to claim 1, wherein:
the tip component portion includes:
a tip portion protruding from the first end of the cylindrical metal pipe in the axial direction,
a coupling core portion disposed within the recessed hole of the cylindrical metal pipe and coupled to the inner wall surface of the cylindrical metal pipe on the first end of the cylindrical metal pipe in the axial direction,
a second ring-shaped end surface on a side of the tip portion that is coupled to the coupling core portion, the second ring-shaped end surface contacting a first ring-shaped end surface around the recessed hole of the cylindrical metal pipe on the first end of the cylindrical metal pipe in the axial direction, and
a tip center portion and a tip periphery portion,
the first ring-shaped end surface is covered by the second ring-shaped end surface,
the tip center portion is made of a material that is softer than a material from which the tip periphery portion is made,
the tip center portion is extends across the tip portion and the coupling core portion,
the tip periphery portion partially covers the tip center portion excluding an end portion of the tip center portion that is adjacent to the tip portion, and
the second ring-shaped end surface is formed on the tip periphery portion.

3. The electronic pen core body according to claim 2, wherein:
the tip center portion is made of elastomer, and
the tip periphery portion is fused and connected to the tip center portion.

4. The electronic pen core body according to claim 1, wherein:
the tip component portion is made of felt,
the axis component portion is made of resin, and
the axis component portion is fused and connected to the tip component portion.

5. The electronic pen core body according to claim 1, wherein:
the tip component portion includes:
a tip portion protruding from the first end of the cylindrical metal pipe in the axial direction,
a coupling core portion disposed within the recessed hole of the cylindrical metal pipe and coupled to the inner wall surface of the cylindrical metal pipe on the first end of the cylindrical metal pipe in the axial direction,
a second ring-shaped end surface on a side of the tip portion that is coupled to the coupling core portion, the second ring-shaped end surface contacting a first ring-shaped end surface around the recessed hole of the cylindrical metal pipe on the first end of the cylindrical metal pipe in the axial direction, and
the coupling core portion of the tip component portion presses against the inner wall surface of the cylindrical metal pipe.

6. The electronic pen core body according to claim 5, wherein:
the coupling core portion of the tip component portion has a tapered shape, and
the coupling core portion of the tip component portion includes a first end and a second in the axial direction,
the first end of the coupling core portion of the tip component portion is adjacent to the tip portion, and the first end of the coupling core portion of the tip component portion is thicker than the second end of the coupling core portion of the tip component portion.

7. The electronic pen core body according to claim 5, wherein:
the coupling core portion of the tip component portion presses against and is glued to the inner wall surface of the cylindrical metal pipe.

8. The electronic pen core body according to claim 1, wherein:
the tip component portion includes:
a tip portion protruding from the first end of the cylindrical metal pipe in the axial direction,
a coupling core portion disposed within the recessed hole of the cylindrical metal pipe and coupled to the inner wall surface of the cylindrical metal pipe on the first end of the cylindrical metal pipe in the axial direction,
a second ring-shaped end surface on a side of the tip portion that is coupled to the coupling core portion, the second ring-shaped end surface contacting a first ring-shaped end surface around the recessed hole of the cylindrical metal pipe on the first end of the cylindrical metal pipe in the axial direction, and
a side circumferential surface of the tip portion of the tip component portion is flush with a side circumferential surface of the axis component portion when the tip component portion is coupled to the axis component portion.

9. The electronic pen core body according to claim 1, wherein:
the tip component portion includes:
a tip portion protruding from the first end of the cylindrical metal pipe in the axial direction,
a coupling core portion disposed within the recessed hole of the cylindrical metal pipe and coupled to the inner wall surface of the cylindrical metal pipe on the first end of the cylindrical metal pipe in the axial direction, and
a second ring-shaped end surface on a side of the tip portion that is coupled to the coupling core portion, the second ring-shaped end surface contacting a first ring-shaped end surface around the recessed hole of the cylindrical metal pipe on the first end of the cylindrical metal pipe in the axial direction, and
a side circumferential surface of the tip portion of the tip component portion adjacent to the second ring-shaped end surface protrudes in a direction orthogonal to the axial direction with respect to a side circumferential surface of the axis component portion.

10. The electronic pen core body according to claim 1, wherein:
the axis component portion includes a cylindrical axis body member made of a material that is harder than a material from which the tip component portion is made, and a fitting member including the fitting portion for transmitting pen pressure to the pen pressure detector,
the recessed hole of the cylindrical metal pipe is included on a first end of a hollow portion of the cylindrical axis body member in the axial direction, and
the fitting member includes a fitting portion inserted into and fitted to a second end of the hollow portion of the cylindrical axis body member in the axial direction.

11. The electronic pen core body according to claim 10, wherein:
the fitting member is made of resin.

12. The electronic pen core body according to claim 1, wherein:
the axis component portion includes a link portion disposed outside of the cylindrical metal pipe between the fitting portion and the pen pressure detector fitting portion,
the link portion is formed in a disk shape with an outer diameter equal to an outer diameter of the cylindrical metal pipe, and
the link portion is in contact with a third ring-shaped end surface around the recessed hole of the cylindrical metal pipe at the second end of the cylindrical metal pipe.

13. The electronic pen core body according to claim 1, wherein at least a first end of the axis component portion in the axial direction is made of a material that is harder than a material from which the tip component portion is made, the first end being coupled to the tip component portion.

14. An electronic pen comprising:
a cylindrical housing;
a core body including a tip which, in operation, protrudes from an opening of the cylindrical housing; and
a pen pressure detector in the cylindrical housing, wherein the pen pressure detector, in operation, detects pen pressure applied to the core body,
wherein:
the core body includes a tip component portion and an axis component portion coupled to the tip component portion,
the axis component portion includes:
a cylindrical metal pipe having an inner wall surface surrounding a recessed hole, the inner wall surface of the cylindrical metal pipe coupled to the tip component portion on a first end of the cylindrical metal pipe in an axial direction of the cylindrical housing, and
a fitting portion having an axis body portion fitting portion disposed within the recessed hole of the cylindrical metal pipe and coupled to the inner wall surface of the cylindrical metal pipe on a second end of the cylindrical metal pipe in the axial direction, and a pen pressure detector fitting portion disposed outside of the cylindrical metal pipe, the pen pressure detector fitting portion having a ring-shaped protrusion portion fitted to a fitting hole of the pen pressure detector to transmit pen pressure to the pen pressure detector.

15. The electronic pen according to claim 14, wherein:
the tip component portion of the core body includes:
a tip portion protruding from the first end of the cylindrical metal pipe in the axial direction of the cylindrical housing
a coupling core portion disposed within the recessed hole of the cylindrical metal pipe and coupled to the inner wall surface of the cylindrical metal pipe on the first end of the cylindrical metal pipe in the axial direction,
a second ring-shaped end surface on a side of the tip portion that is coupled to the coupling core portion, the second ring-shaped end surface contacting a first ring-shaped end surface around the recessed hole of the cylindrical metal pipe on the first end of the cylindrical metal pipe in the axial direction, and the first ring-shaped end surface is covered by the second ring-shaped end surface, and a tip center portion and a tip periphery portion, the tip center portion is made of a material that is softer than a material from which the tip periphery portion is made, the tip center portion extends across the tip portion and the coupling core portion, the tip periphery portion partially covers the tip center portion excluding an end portion of the tip center portion that is adjacent to the tip portion, and the second ring-shaped end surface is formed on the tip periphery portion.

16. The electronic pen according to claim 15, wherein:
the tip center portion is made of elastomer, and
the tip periphery portion is fused and connected to the tip center portion.

17. The electronic pen according to claim 14, wherein:
a magnetic core is disposed in the cylindrical housing,
a coil is wound around the magnetic core,
the pen pressure detector is on a side of the magnetic core opposite a side of the opening of the cylindrical housing in the axial direction of the cylindrical housing, and
the axis component portion of the core body is disposed in a through hole of the magnetic core.

18. The electronic pen according to claim 17, wherein:
the tip component portion includes:
   a tip portion protruding from the first end of the cylindrical metal pipe in the axial direction of the cylindrical housing
   a coupling core portion disposed within the recessed hole of the cylindrical metal pipe and coupled to the inner wall surface of the cylindrical metal pipe on the first end of the cylindrical metal pipe in the axial direction,
   a second ring-shaped end surface on a side of the tip portion that is coupled to the coupling core portion, the second ring-shaped end surface contacting a first ring-shaped end surface around the recessed hole of the cylindrical metal pipe on the first end of the cylindrical metal pipe in the axial direction, and
   the first ring-shaped end surface is covered by the second ring-shaped end surface, and
the tip portion of the tip component portion and part of the axis component portion, in operation, protrude from the opening of the cylindrical housing when the axis component portion is disposed in the through hole of the magnetic core and the fitting portion is directly or indirectly fitted to the pen pressure detector.

19. The electronic pen according to claim 18, wherein:
part of the magnetic core protrudes from the opening of the cylindrical housing when the tip of the core body protrudes from the opening of the cylindrical housing.

20. The electronic pen according to claim 14, wherein:
the axis component portion includes a link portion disposed outside of the cylindrical metal pipe between the fitting portion and the pen pressure detector fitting portion,
the link portion is formed in a disk shape with an outer diameter equal to an outer diameter of the cylindrical metal pipe, and
the link portion is in contact with a third ring-shaped end surface around the recessed hole of the cylindrical metal pipe at the second end of the cylindrical metal pipe.

* * * * *